(No Model.)
T. W. EATON.
BRAKE FOR ELEVATORS.
No. 446,621. Patented Feb. 17, 1891.
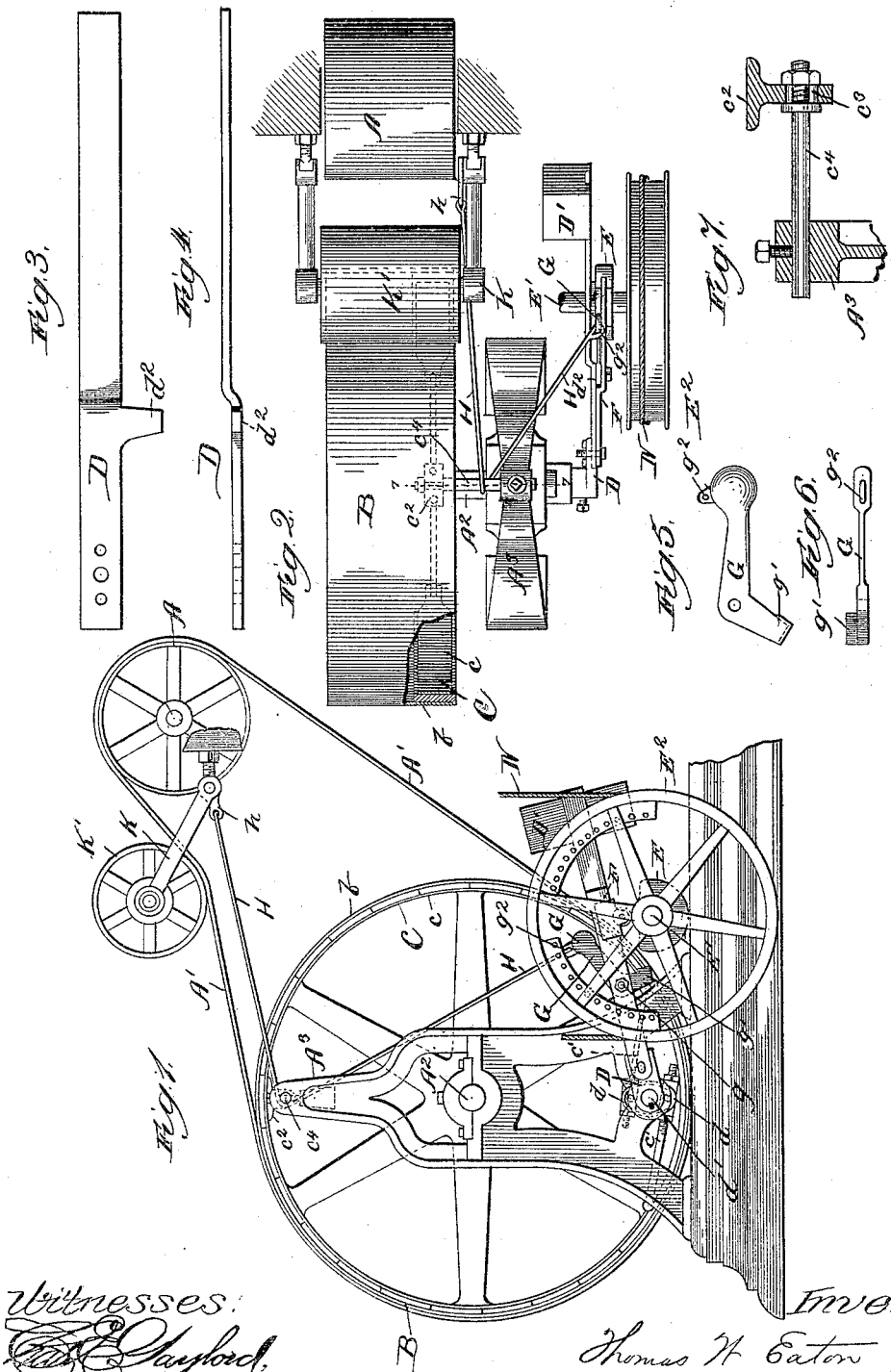

UNITED STATES PATENT OFFICE.

THOMAS W. EATON, OF CHICAGO, ILLINOIS, ASSIGNOR TO THE EATON & PRINCE COMPANY, OF SAME PLACE.

BRAKE FOR ELEVATORS.

SPECIFICATION forming part of Letters Patent No. 446,621, dated February 17, 1891.

Application filed April 26, 1890. Serial No. 349,467. (No model.)

*To all whom it may concern:*

Be it known that I, THOMAS W. EATON, a citizen of the United States, residing in Chicago, in the county of Cook and State of Illinois, have invented a new and useful Improvement in Brakes for Elevators, of which the following is a specification.

My invention relates to improvements in elevators, and more particularly to improvements in the brake mechanism for steam-elevators.

The object of my invention is to provide a brake mechanism of a simple, efficient, and durable construction which may be readily operated by hand in the usual way from the car, and which may be also operated automatically in case the driving-belt should break.

My invention consists, in connection with the weighted brake-operating lever, of a weight or equivalent device normally sustained by the driving-belt and which by its descent when the driving-belt breaks serves to operate or release the weighted brake-lever, so that the brake is instantly and automatically applied in case of accident and danger or damage thus prevented. The mechanism by which the belt-supported weight is connected to the brake-operating lever may be of any suitable form; but that which I prefer to use and have specially devised for the purpose, and in which another feature of my improvement consists, is composed of a cord or line and an intermediate lever or movable arm, by which the weighted brake-operating lever is normally connected with and supported from the lever, which rests upon and is operated by the cam on the hand-cable sheave or its shaft.

My invention also consists in the novel devices and novel combinations of parts and devices herein shown and described, and more particularly pointed out in the claims.

In the accompanying drawings, which form a part of this specification, Figure 1 is a side elevation of a device embodying my invention. Fig. 2 is a plan view. Fig. 3 is a side view of the weighted lever by which the brake is operated. Fig. 4 is a top or edge view of said lever. Fig. 5 is a detailed side view of the intermediate lever, by which the weighted brake-operating lever is normally supported from the cam-lever; and Fig. 6 is a top edge view of the lever shown in Fig. 5. Fig. 7 is a partial section on the line 7 7 of Fig. 2.

In the drawings, A represents the driving-pulley on the engine; A', the driving-belt, and $A^2$ is the shaft which carries the brake-wheel B. Said shaft $A^2$ is geared to the winding-drum of the elevator in the usual way.

$A^3$ is a standard in which said shaft $A^2$ is supported.

The brake-wheel B has a rim $b$, in which fits the interior expanding brake C. The brake C consists of sheets or strips of wood secured to a metal band $c$. The two ends of the brake C are connected to the opposite arms or projections $d$ of the brake-lever D by pivoted links $c'$ $c'$, so that the rocking of the lever D will operate to tighten or loosen the brake against the rim of the brake-wheel. The lever D is furnished with weight D', by which the brake is applied.

F is the cam-lever, or lever which rests upon the cam E of the shaft E' of the hand-cable sheave $E^2$. The lever F may be preferably pivoted to the lever D near the pivot $d'$ of said lever.

G is the intermediate lever, pivoted at $g$ to the cam-lever F and having a lip or projection $g'$, which engages an arm or projection $d^2$ on the brake-lever D, so that the weighted brake-lever D will be supported by the cam-lever F. The intermediate lever G has an eye $g^2$, with which is connected a line H of rope, chain, or other flexible material. The line H is connected at $h$ to the rigid frame-work of the engine, so that it will pass directly under the pivoted or swinging housing K of the belt-tightening pulley K'. The pulley K' may preferably be made heavy enough so that it will exert the requisite force or pressure against the belt A' by its own weight or gravity.

N is the hand-cable, which extends from the hand-cable sheave $E^2$ to the car and by which the brake is normally operated.

In case the driving-belt A' should break or become displaced by accident the pulley or weight K', which is normally supported by the belt A', will descend upon the cord H and move the intermediate lever or latch G, so that its lip $g'$ will permit the projections $d^2$ on the brake-lever D to drop off thereof, and thus permit the brake-lever to descend and apply the brake instantly and automatically.

At $c^2$ is a movable supporting-block mounted upon the shaft $c^4$ and secured to the under surface of the brake-band $c$. This block sustains the weight of the brake when the latter is not in operation, and when the brake is thrown into operation the enlarged slot $c^3$ at shaft $c^4$ avoids any interference by the block with the expansion or rising of the brake.

I claim—

1. The combination, in an elevator, of a driving-belt, brake-wheel, and brake with a weighted brake-operating lever, a cam-shaft, a cam-lever operated by said cam, and an intermediate lever pivoted to said cam-lever for normally supporting said brake-lever, a movable weight or device normally supported by said driving-belt, and a connection from said intermediate lever arranged in the path of said belt-supported weight, so that the brake will be operated in case of accident, substantially as specified.

2. The combination, with a brake-wheel and brake, of the brake-lever D, cam-lever F, intermediate lever G, brake-operating cam E, driving-belt A', line H, and movable or swinging weight K', substantially as specified.

3. The combination, with a brake-wheel and brake, of the brake-lever D, cam-lever F, intermediate lever G, brake-operating cam E, driving-belt A', line H, and movable or swinging weight K', said lever D having a projection $d^2$ and said intermediate lever G having a lip or projection $g'$, engaging said projection $d^2$, substantially as specified.

4. The combination, with a brake-wheel B, having rim $b$, of an interior-fitting brake C, an operating-lever D, having arms $d$, connected by pivoted links $c'$ with the ends of said interior brake C, cam-lever F, and intermediate lever G, substantially as specified.

5. The combination of a brake-wheel, brake, brake-lever, and connecting-links with a cam and cam-lever F and intermediate lever G and mechanism for automatically operating said lever G in case of accident, substantially as specified.

6. The combination, with the interior brake C, of the supporting-block $c^2$, mounted upon a stationary support and acting to sustain the brake when it is not in operation, substantially as set forth.

THOMAS W. EATON.

Witnesses:
EMMA HACK,
H. M. MUNDAY.